US008620960B1

(12) United States Patent
Denton, III et al.

(10) Patent No.: US 8,620,960 B1
(45) Date of Patent: Dec. 31, 2013

(54) METHOD FOR REPRESENTING MULTI-MODELS

(75) Inventors: Leet E. Denton, III, Philadelphia, PA (US); Ramakrishnan Srinivasan, San Jose, CA (US); Kenneth Owens, Mount Laurel, NJ (US); Richard W. Buskens, Robbinsville, NJ (US); Edward Jones, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 389 days.

(21) Appl. No.: 12/873,464

(22) Filed: Sep. 1, 2010

Related U.S. Application Data

(60) Provisional application No. 61/238,896, filed on Sep. 1, 2009.

(51) Int. Cl.
*G06F 17/30* (2006.01)
(52) U.S. Cl.
USPC .............................. 707/796; 703/3
(58) Field of Classification Search
USPC ...................... 707/796, 790; 703/3
See application file for complete search history.

(56) References Cited

U.S. PATENT DOCUMENTS

| | | | | |
|---|---|---|---|---|
| 5,611,076 | A * | 3/1997 | Durflinger et al. ............ | 1/1 |
| 5,713,014 | A * | 1/1998 | Durflinger et al. ............ | 1/1 |
| 6,560,592 | B1 | 5/2003 | Reid et al. | |
| 7,499,899 | B2 | 3/2009 | Siegel et al. | |
| 2004/0015824 | A1 | 1/2004 | Felkey et al. | |
| 2006/0168558 | A1 * | 7/2006 | de Seabra e Melo et al. | 717/105 |
| 2009/0235227 | A1 | 9/2009 | Hartman et al. | |

OTHER PUBLICATIONS

Hessellund, A., et al, "Guided Development with Multiple Domain-Specific Languages", MODELS 2007 (2007), pp. 1-15.
Greenfield, J., et al, "Software Factories", Wiley (2004), pp. 142-143, 568-569, 570-571.
Nuseibeh, B., et al, "A Framework for Expressing the Relationships Between Multiple Views in Requirements Specification", IEEE Transaction on Software Engineering, Oct. 1994, pp. 1-20.
Hardebolle, C., et al, "A Generic Execution Framework for Models of Computation", MOMPES 2007, IEEE Computer Society (Mar. 31, 2007).
Karsai, G., et al, "Design patterns for open tool integration", Software and Systems Modeling (2005), pp. 157-170.

(Continued)

*Primary Examiner* — John Breene
*Assistant Examiner* — Joshua Bullock
(74) *Attorney, Agent, or Firm* — Howard IP Law Group, PC

(57) ABSTRACT

A data model representing a multi-model database of a product system includes a multi-model repository that holds said multi-model database's artifacts under version control. The multi-model repository holds a plurality of constituent models, wherein each model represents a discrete aspect of the system, a model registry containing a list of the constituent models in the multi-model database, a set of input attributes and a set of output attributes corresponding to each of the models, a set of interfaces representing a tuple corresponding to each of the models, a set of attribute constraints associated with the input and output attributes; and a set of notifications associated with each of the models for informing the models of defined events.

12 Claims, 8 Drawing Sheets

(56) References Cited

OTHER PUBLICATIONS

Olveczky, P., et al, "Semantics and Pragmatics of Real-Time Maude", Higher-Order and Symbolic Computation (20) 1(2007) 1-35.

Brooks, C., et al, "Multimodeling: A Preliminary Case Study", Technical Report No. UCB/EECS-2008-7, EECS Department, University of California, Berkeley, (Jan. 17, 2008).

Zave, P., et al, "Where Do Operations Come From? A Multiparadigm Specification Technique", IEEE Transactions on Software Engineering, vol. 22, No. 7, Jul. 1996, pp. 508-528.

Girault, A., et al, "Hierarchical Finite State Machines with Multiple Concurrency Models", IEEE Transactions on Computer-Aided Design of Integrated Circuits and Systems, vol. 18, No. 6, Jun. 1999, pp. 742-760.

Steffen, B., et al, "The Electronic Tool Integration platform: concepts and design", International Journal on Software Tools for Technology Transfer (STTT) 1(1) (1997) 9-30.

Margaria, T., et al, "jETI: A Tool for Remote Tool Integration", TACAS (2005), LNCS 3440, pp. 557-562, 2005.

Wimmer, M. et al, "A Semi-automatic Approach for Bridging DSLs with UML", Proceedings of the 7th OOPSLA Workshop on Domain-Specific Modeling (2007).

Kappel, G., et al, "ModelCVS—A Semantic Infrastructure for Model-based Tool Integration", Technical report, Johannes Kepler University of Linz and Vienna University of Technology (2005), pp. 1-27.

Brauer, M., et al, "Towards Semantic Integration of Multiple Domain-Specific Languages Using Ontological Foundations", Proceedings of the 4th International Workshop on (Software) Language Engineering (ATEM) (2007).

\* cited by examiner

MULTI-MODEL RESPOSITORY LAYOUT.

ATTRIBUTES DIRECTORY RESPOSITORY LAYOUT.

EXECUTION DIRECTORY RESPOSITORY LAYOUT.

INTERFACES DIRECTORY RESPOSITORY LAYOUT.

MODELS DIRECTORY RESPOSITORY LAYOUT.

NOTIFICATIONS DIRECTORY RESPOSITORY LAYOUT.

```
<?xml version="1.0"?>
<xs:schema xmlns:xs="http://www.w3.org/2001/XMLSchema"
targetNamespace="http://www.atl.lmco.com/naomi/attributes"
elementFormDefault="qualified">
    <xs : element  name="attribute">
        <xs : complexType>
            <xs : sequence>
                <xs : element  name="owner" type="xs : string" />
                <xs : element  name="value" type="xs : string" />
                <xs : element  name="units" type="xs : string" minOccurs="0"/>
                <xs : element  name="documentation" type="xs : string" minOccurs="0"/>
            </xs : sequence>
        </xs : complexType>
    </xs : element>
</xs : schema>
```

SIMPLE ATTRIBUTE SCHEMA ATTRIBUTE_SIMPLE.XSD.

FIG. 8

```
<?xml version="1.0"?>
<attribute  xmlns="http://www.atl.lmco.com/naomi/attributes"
xmlns:xsi="http://www.w3.org/2001/XMLSchema-instance"
xsi:schemaLocation="http://www.atl.lmco.com/naomi atttribute_simple.xsd">
    <owner>Excel:reliability_model.xml</owner>
    <value>1</value>
    <units>unknown</units>
    <documentation>created by naomi_excel_xml.pl</documentation>
</attribute>
```

SIMPLE ATTRIBUTE EXAMPLE XML FILE.

FIG. 9

```xml
<?xml version="1.0"?>
<xs:schema xmlns:xs="http://www.w3.org/2001/XMLSchema"
targetNamespace="http://www.atl.lmco.com/naomi/interfaces"
elementFormDefault="qualified">
    <xs:element name="interface">
        <xs:complexType>
            <xs:sequence>
                <xs:element name="name" type="xs:string" />
                <xs:element name="type" type="xs:string" />
                <xs:element name="input" minOccurs="0" maxOccurs="unbounded">
                    <xs:complexType>
                        <xs:simpleContent>
                            <xs:extension base="xs:anyURI">
                                <xs:attribute name="checksum" type="xs:string"/>
                            </xs:extension>
                        </xs:simpleContent>
                    </xs:complexType>
                </xs:element>
                <xs:element name="output" minOccurs="0" maxOccurs="unbounded">
                    <xs:complexType>
                        <xs:simpleContent>
                            <xs:extension base="xs:anyURI">
                                <xs:attribute name="checksum" type="xs:string"/>
                            </xs:extension>
                        </xs:simpleContent>
                    </xs:complexType>
                </xs:element>
            </xs:sequence>
        </xs:complexType>
    </xs:element>
</xs:schema>
```

*FIG. 10*

```xml
<?xml version="1.0"?>
<interface xmlns="http://www.atl.lmco.com/naomi/interfaces"
xmlns:xsi="http://www.w3.org/2001/XMLSchema-instance"
xsi:schemaLocation="http://www.atl.lmco.com/naomi ../interface.xsd">
    <name>test</name>
    <type>Excel</type>
    <input>system.reliability</input>
    <output>carsignalling.checkpointing.frequency</output>
</interface>
```

*FIG. 11*

```
<?xml version="1.0"?>
<xs:schema xmlns:xs="http://www.w3.org/2001/XMLSchema"
targetNamespace="http://www.atl.lmco.com/naomi/models"
elementFormDefault="qualified">
    <xs : element  name="models">
        <xs : complexType>
            <xs : sequence>
                <!-- a single model -->
                <xs : element name="model" minOccurs="0" maxOccurs="unbounded">
                    <xs : complexType>
                        <xs : sequence>
                            <xs : element name="name" type="xs:string"/>
                            <xs : element name="type" type="xs:string"/>
                            <xs : element name="alias" type="xs:string"/>
                            <xs : element name="executable" type="xs:boolean"/>
                            <xs : element name="interface" type="xs:anyURI"/>
                        </xs : sequence>
                    </xs : complexType>
                </xs : element>
            </xs :sequence>
        </xs : complexType>
    </xs : element>
</xs : schema>
```

REGISTRY SCHEMA

FIG. 12

```
<?xml version="1.0"?>
<models  xmlns="http://www.atl.lmco.com/naomi/models"
xmlns:xsi="http://www.w3.org/2001/XMLSchema-instance"
xsi:schemaLocation="http://www.atl.lmco.com/naomi/models naomi_models.xsd">
    <model>
        <name>test model</name>
        <type>Excel</type>
        <alias>test</alias>
        <interface>test/test_interface.xml</interface>
    </model>
    <model>
        <name>test model2</name>
        <type>Excel<type>
        <alias>test2</alias>
        <interface>test2/test2_interface.xml</interface>
    </model>
</models>
```

REGISTRY EXAMPLE

FIG. 13

METHOD FOR REPRESENTING MULTI-MODELS

CROSS-REFERENCE TO RELATED APPLICATION

This application claims the benefit under 35 U.S.C. §119(e) of U.S. Provisional Application Ser. No. 61/238,896 filed Sep. 1, 2009 the disclosure of which is incorporated herein by reference in its entirety.

FIELD OF THE INVENTION

This disclosure is generally related to modeling technology and more particularly related to data modeling of a multi-model representation of a product system.

BACKGROUND

In designing a product system, whether it be a computer system or other systems such as an aircraft, a ship, a missile, etc., incomplete product system design specifications can lead to serious problems that do not manifest themselves until very late in the product system development cycle—when the costs to repair such problems can be astronomical. Model-driven design techniques can expose design flaws early in the product system development cycle and minimize the cost of design change.

Invariably, multiple models are needed to comprehensively model all aspects of a product system under design, encompassing system structure and behavior, and possibly other aspects such as cost. However, general-purpose modeling languages lack the semantic precision required to model all aspects of a system. In order to capture domain-specific semantics, these general-purpose modeling languages may be extended with domain-specific extensions (e.g., the UML profile for Modeling and Analysis of Real-time and Embedded systems). Alternately, one could use Domain Specific Modeling Languages (DSMLs) that offer capabilities needed for the specific purpose—e.g., use MATLAB® for mathematical models or Simulink® for simulation models. In either case, no single modeling language can be rich enough to capture all aspects of a system under design.

Therefore, there is a need for model-centric systems engineering and development that does not require or depend on the existence of a single all-encompassing general-purpose model language. Multi-modeling, the use of multiple models, appears to be a better approach. However, the use of multiple models that deal with diverse aspects of the system under design presents several challenges such as data and semantic consistency.

SUMMARY

According to an embodiment of the present disclosure, a data model representing a multi-model database of a product system is disclosed. Such multi-model database comprises a multi-model repository that holds the multi-model database's artifacts under version control. The multi-model repository comprises a plurality of constituent models, wherein each model represents a discrete aspect of the system, a model registry containing a list of the constituent models in the multi-model database, a set of input and output attributes corresponding to each of the models, a set of interfaces representing a tuple corresponding to each of the models, a set of attribute constraints associated with the input and output attributes, and a set of notifications associated with each of the models for informing the models of defined events. A tuple represents the notion of an ordered list of elements. Here, the tuple contains a mapping operation and the set of input attributes and the set of output attributes.

The data model of a multi-model database of a system allows for integration of a wide variety of modeling tools using a uniform representation of models and data model. The modelers (system designers) can freely construct multiple models using a suite of diverse domain-specific modeling languages (DSMLs) or general purpose modeling languages where each modeling language allows specific aspects of a system to be precisely modeled and interrelate the various models into a composition as a multi-model database.

According to another embodiment, a computer database system is disclosed. The computer database system comprises a processing unit and data storage that is accessible by the processing unit. The data storage stores a multi-model database of a product system therein. The multi-model database comprises a multi-model repository that holds the multi-model database's artifacts under version control, wherein the multi-model repository comprises a plurality of models (where each model represents a discrete aspect of the system), a model registry containing a list of the models in the multi-model database, a set of input and output attributes corresponding to each of the models, a set of interfaces representing a tuple corresponding to each of the models (wherein said tuple containing a mapping operation and said set of input attributes and set of output attributes), a set of attribute constraints associated with the input and output attributes, and a set of notifications associated with each of the models for informing the models of defined events.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein:

FIG. 8 shows the schema for simple attributes.

FIG. 9 shows a sample of a simple attribute file in XML format.

FIG. 10 shows the schema for model interfaces.

FIG. 11 shows a sample of XML interface file.

FIG. 12 shows the schema for the model registry.

FIG. 13 shows an example of XML model registry file.

All drawings are schematic and are not intended to show any dimensions to scale.

DETAILED DESCRIPTION

This description of the preferred embodiments is intended to be read in conjunction with the accompanying drawings, which are to be considered part of the entire written description of this invention.

Figure 1:
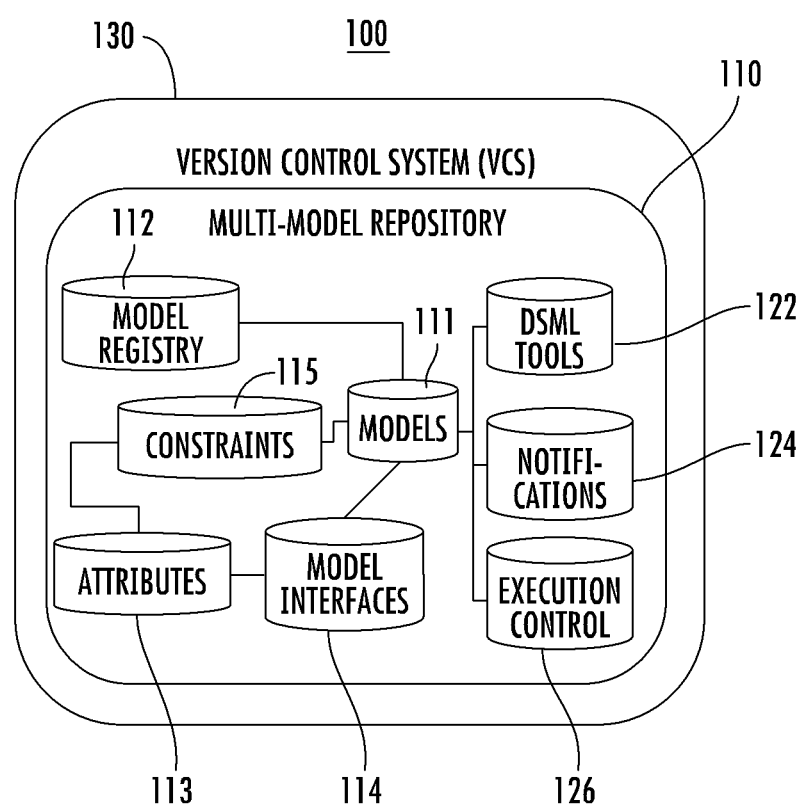
FIG. 1 is a schematic representation of the organization of the multi-model repository according to an embodiment of the present disclosure.

Referring to the schematic diagram of FIG. 1, a data model representing a multi-model database 100 of a computer system according to an embodiment of the present disclosure is described. The multi-model database 100 is constructed from models data dataset 111 for a plurality of constituent models using DSMLs and can represent a wide variety of modeling paradigms. The multi-model database 100 can be constructed by treating each of the constituent models 111 as black boxes that can operate with a set of data items as inputs and produce a set of data items as outputs.

The multi-model database 100 is comprised of various entities or datasets. We use the term artifacts to describe these datasets that define the multi-model database 100. These artifacts include a model registry dataset 112, the constituent models data dataset 111, model interfaces dataset 114, model attributes dataset 113, model attribute constraints dataset 115, model data editing tools dataset 122 (e.g. DSML tools), notifications dataset 124, and multi-model execution control dataset 126. All of the artifacts are stored in a multi-model repository 110 which is preferably version controlled using a version control system 130. This allows the entire multi-model database 100 to be reconstructed at any point during the evolution and for distributed collaboration via modifications to artifacts in the multi-model repository 110.

The model registry dataset 112 is used to determine membership in the multi-model database 100. The model registry dataset 112 is a list of a plurality of constituent DSML models that are participating in the multi-model. If a constituent model is removed from the model registry dataset 112, the artifacts that correspond to that model remain in the multi-model repository 110, but that model will not participate in the multi-model. Each entry in the model registry dataset 112 is a proxy for a corresponding models data dataset 111. The models data dataset 111 comprises the plurality of the DSML models and is stored in whatever format the model data editing tools dataset 122 choose to maintain the data. Although not required, by storing the models data dataset 111 and model editing tools dataset 122 in the multi-model repository 110, a more complete set of operations is possible.

Each of the constituent models in the models data dataset 111 can be considered as essentially a mapping operation written in a modeling language, $L_i$, over a set of inputs, that produces a set of outputs. A model, $M_j$, is associated with a set of attributes that are inputs $I_j=\{a_1, a_2, \ldots, a_n\}$, which may be empty, and a set of attributes that are outputs $O_j=\{a'_1, a'_2, \ldots, a'_n\}$, which may also be empty. We can then represent the model, $M_j$ by the tuple $M_j(L_i, I_j, O_j)$ containing a mapping operation, $L_i$, and the set of input, $I_j$, output, $O_j$, model attributes. This tuple is the interface data that the model exposes to the system by adding it to the model interface dataset 114 of the multi-model repository 110. A multi-model database 100, M, can then be defined as a set of models $M=\{M_1, M_2, \ldots, M_m\}$. To synchronize execution of the multi-model, we require that an attribute is owned by a single constituent model and can only be written by the model that owns it. That is, if $a_i \in O_j$, then $a_i \notin O_n \forall O_{n \neq j} \in M$.

The constituent models can have an attribute constraints dataset 115 associated with their input attributes and output attributes. These attribute constraints can be thought of as triggers on the value of the associated attribute. If a first constituent model has a constraint on input attribute $a_i$ associated with or owned by a second model, then the first model is notified when the second model that owns $a_i$ outputs a value that violates this constraint. Output constraints are used by a model to ensure that the attributes that are written are valid from the point of view of the model that writes them.

The model data editing tool dataset 122 artifacts are model-editing tools, or references to them, that correspond to the constituent models. For example, in case of a MATLAB® model, the model data editing tool can be either the actual MATLAB® software, or a reference to the specific version of MATLAB® program used to create the model.

A set of notifications dataset 124 artifacts are messages that are sent to the constituent models to inform them of occurrence of defined events. For example, when a modeler edits one of the plurality of DSML models which generates a change to an output attribute that violates some attribute constraint, a notification is sent to the affected models.

Multi-model execution control dataset 126 artifacts consist of multi-model execution plan, its modifications, and message queues. When a multi-model administrator, who maintains the multi-model repository 110, makes a change to the execution plan, the resulting plan and the changes are stored in these artifacts. Moreover, when the execution co-ordination engine orchestrates the execution, it needs to send and receive messages from the individual models. These artifacts also capture the queues containing those messages.

The multi-model database 100 incorporates a version control system 130, thus incorporating the commonly used basic version control system operations such as check-in, check-out and history examination into the multi-model repository 110. This can be realized by using a commonly available open source version control system, such as a Subversion repository. The use of a source code version control system such as Subversion enables versioning of models and their shared concepts (attributes) so that exploration of the design space can be accomplished in a systematic and controlled manner.

The multi-model database 100 of the present disclosure can provide a sandbox feature so that modelers can interact with the multi-model repository 110 through local copies of the multi-model repository 110 in sandboxes. Sandboxes allow modelers to work on local copies of their constituent models without being affected by concurrent changes to the multi-model from other modelers. To interact with a project, modelers checkout local copies of the repository and make modifications. The modifications are communicated to other models by synchronization with the global version of the repository.

The concept of the sandbox, sometimes also called a working directory, a test server or a development server, is typically built into version control software such as CVS and Subversion, in which developers "check out" a copy of the source code tree, or a branch thereof, to examine and work on.

The term sandbox generally refers to a testing environment that isolates untested code changes and outright experimentation from the production environment or repository, in the context of software development and revision control. Sandboxing protects "live" servers and their data, vetted source code distributions, and other collections of code, data and/or content, proprietary or public, from changes that could be damaging to a mission-critical system or which could simply be difficult to revert. Sandboxes replicate at least the minimal functionality needed to accurately test the programs or other code under development (e.g. usage of the same environment variables as, or access to an identical database to that used by, the stable prior implementation intended to be modified). There are many other possibilities, as the specific functionality needs vary widely with the nature of the code and the application[s] for which it is intended.

Only after the developer has fully tested the code changes in their own sandbox should the changes be checked back into and merged with the multi-model repository 110 and thereby made available to other developers or end users of the software.

Although the embodiment of the multi-model database 100 shown in FIG. 1 is described in the context of multiple models for a computer system, the scope of the present disclosure is also applicable to other systems that a modeler may design using one of the one or more remote-client computers $10_{(1)} \ldots 10_{(n)}$. For example, a product system can be a glider with no computer system on it. The modeler may design the glider using multiple models, e.g.

an aerodynamic model, a reliability model, and a cost model, etc. to help design the glider. The multiple models for the glider would be stored in the multi-model database 100 implemented on a computer database system (see FIG. 14), although the system (the glider) being modeled is not a computer system.

Figure 2:
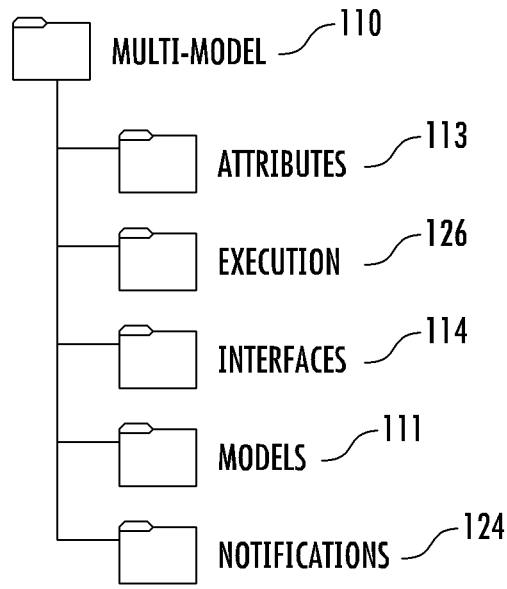
FIG. 2 is a graphic representation of the multi-model repository's layout.
Figure 5:
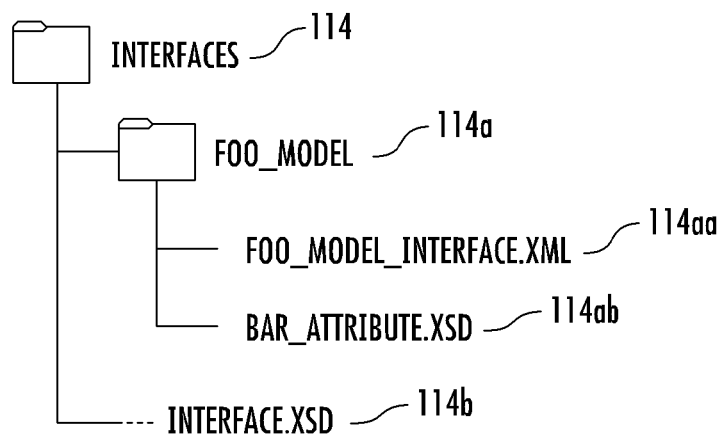
FIG. 5 is a graphic representation of the interfaces directory repository layout.
Figure 6:
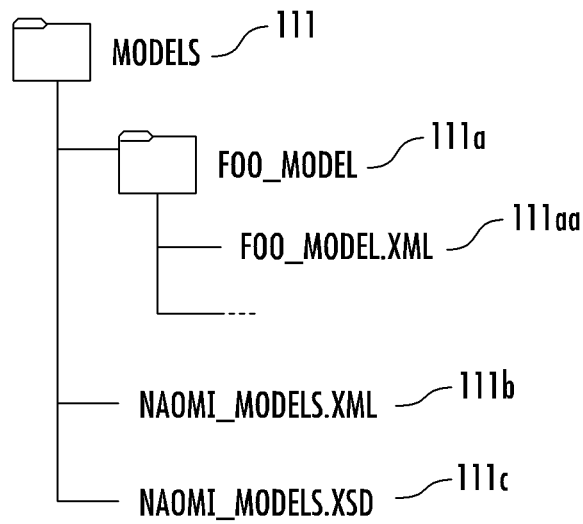
FIG. 6 is a graphic representation of the models directory repository layout.
Figure 7:
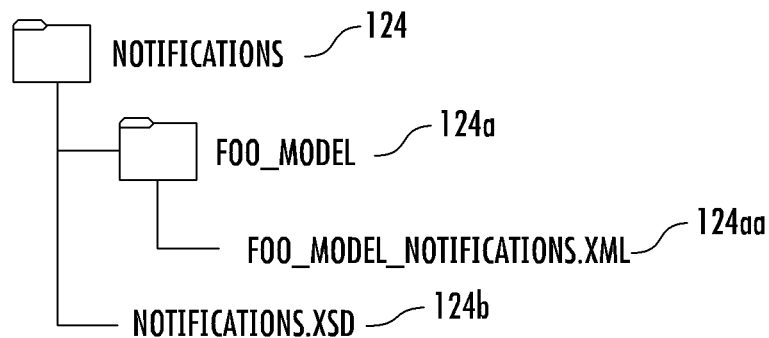
FIG. 7 is a graphic representation of the notifications directory repository layout.

FIG. 2 shows the organization of the multi-model repository 110 in a file tree format. FIGS. 3 through 7 show the layout of the sub-directories of the multi-model repository 110. The DSML models are preferably stored in separate directories under the "models" subdirectory 111 of the multi-model repository 110 as shown in FIG. 6.

Figure 3:
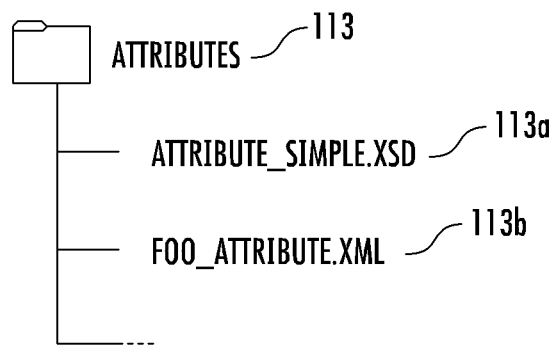
FIG. 3 is a graphic representation of the attributes directory repository layout.
Figure 4:
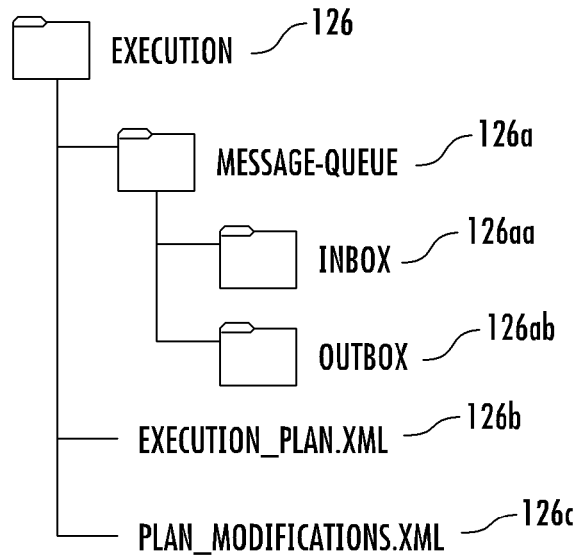
FIG. 4 is a graphic representation of the execution directory repository layout.

Attributes are pieces of data that are shared between the constituent models such as the input and output attributes discussed above. Attributes are saved in XML files 113$b$ in the model attributes dataset 113 as shown in FIG. 3. Each attribute uses a schema that defines what kind of data it holds. Schema generally refers to a structure of a database system or a data set described in a formal language supported by the database management system. FIG. 8 shows an attribute schema 113$a$ for simple attributes. The attribute schema 113$a$ is required at a minimum to support the concept of ownership and a field that holds the value of the attribute. As discussed earlier, although attributes hold data that is shared between the constituent models, an attribute can only be written by a model that owns it and the attribute schema 113$a$ maintains the ownership information. An example of an attribute file 113$b$ is shown in FIG. 9. Table 1 describes an example of the fields in a minimal attribute file 113$b$.

TABLE 1

| Field | Required | Description |
|---|---|---|
| owner | yes | Model that created the attribute |
| value | yes | Value of the attribute |
| units | no | Units of the attribute |
| documentation | no | Description of the attribute |

There is no inherent restriction on the types of data an attribute can hold. Custom attribute types can be defined with their own schemas, and as long as models that read and write them can understand those schemas. This implies that attributes could hold compound values that contained attributes owned by foreign models. If this is the case, then the attribute schema should be rich enough to also contain the first level dependencies of the attribute. For example, if an attribute contains an entire UML diagram, then any embedded attributes read by the owning model should be included as dependencies.

Following our basic premise of treating each model as a black box with its own input and output attributes, each model has an interface file that describes which attributes are inputs to the model and which are outputs. FIG. 10 shows the schema 114$b$ for model interfaces. The interface schema 114$b$ is kept in a file named "interface.xsd" in the interfaces dataset directory 114, as shown in FIG. 5. An example XML interface file 114$aa$ is shown in FIG. 11. The XML interface file 114$aa$ is for an Excel model named "test" that reads the "system.reliability" attribute and writes the "carsignalling.checkpointing.frequency" attribute.

Separate directories are kept for each model interface. These directories can optionally hold private XML schemas that may be used to further validate the contents of attribute files. For example, if the interfaces/test directory held a file named "foo.xsd", then the test connector could validate the "foo" attribute when reading it. The schema could check for attribute values that are out of bounds for the test model, even though the values were valid for other models.

The models registry dataset 112 maintains a list of models participating in a multi-model database. This file 111$b$ is located in the models data dataset subdirectory 111 along with the schema 111$c$.

FIG. 12 and FIG. 13 show the representative schema and a corresponding sample of the model registry dataset file 112. The model registry dataset file 112 maintains information of each model. Examples of elements in the model registry file include the name, type and aliases of the model, whether or not it is executable, and a reference to the interfaces file. In the illustrated example, the model registry file contains information on two Excel models named "test model" and "test model2."

Figure 14:
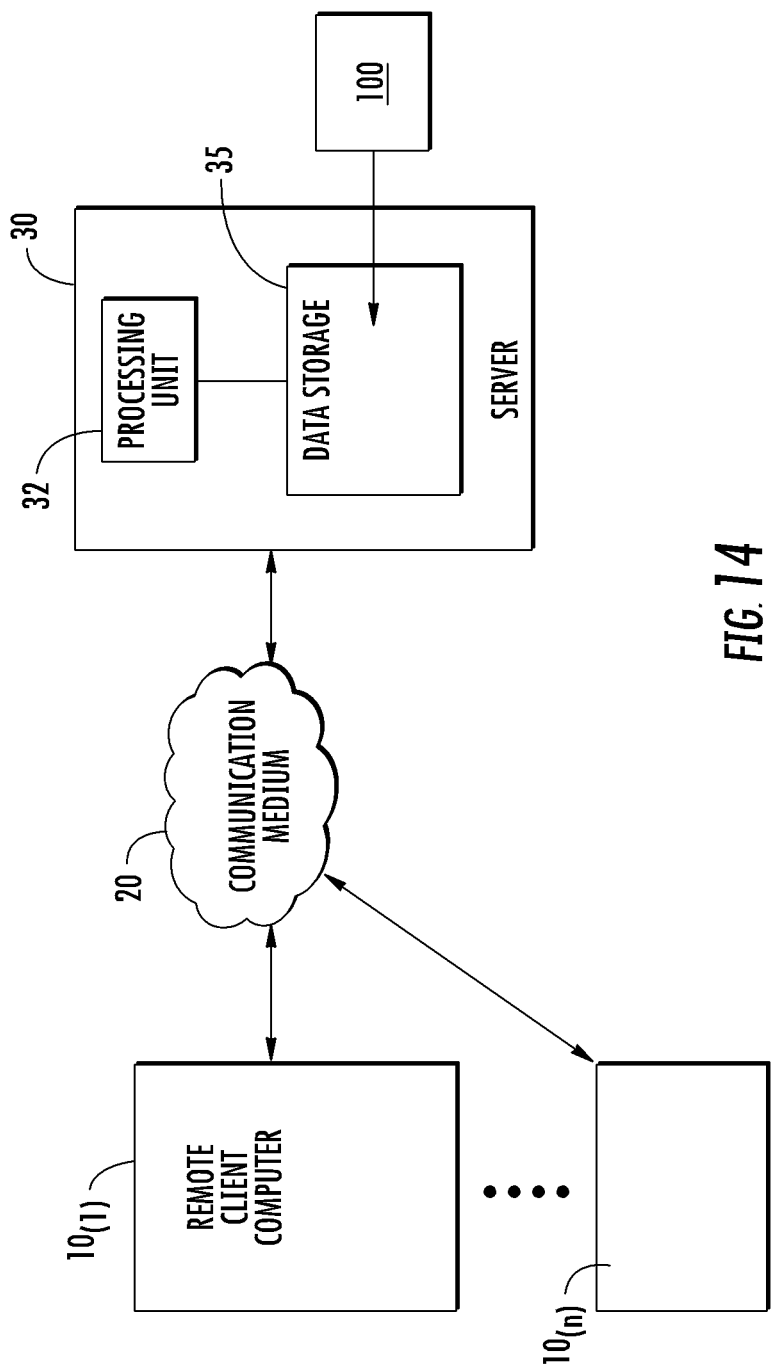
FIG. 14 shows a computer database system according to an embodiment of the present disclosure.

FIG. 14 shows an example of a computer database system in which the multi-model database 100 according to the present disclosure is implemented. The computer database system includes one or more remote client computers $10_{(1)} \ldots 10_{(n)}$ connected to a server 30 via a communication medium 20. The communication medium 20 can be a communications link such as the Internet, a local-area or wide-area network (wired or wireless), or other similar communications link that can provide the function of communication link between the server 30 and the one or more remote client computers $10_{(1)} \ldots 10_{(n)}$ for allowing exchange of data.

The server 30 comprises a processing unit 32 and a data storage 35 that is accessible by the processing unit 32. The processing unit 32 executes and coordinates the operation of the server 30 including the communication of data between the server 30 and the one or more remote client computers $10_{(1)} \ldots 10_{(n)}$) and storing data into and accessing the data from the data storage 35. The data storage 35 can be any of the storage devices that are available in the industry such as hard drives, RAM, ROM, or any other appropriate memory devices for storing large quantity of data. In this embodiment, the multi-model database 100 is stored in the data storage unit 32. The contents and structure of the multi-model database 100 is as described above.

The server 30 and the one or more remote client computers $10_{(1)} \ldots 10_{(n)}$ typically include other common components of a computer, such as a display, user interface devices (e.g. mouse, keyboard, touch-screen interface), etc., that are not explicitly shown here for sake of simplicity because they are well known to one of ordinary skill in the art.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A multi-model database of a product system, said multi-model database comprising:
   a plurality of artifacts that define the multi-model database;
   a multi-model repository that holds said artifacts under version control, wherein said artifacts comprise:
      a models data dataset including a plurality of models, wherein each model is associated with a discrete aspect of the product system;
      a model registry dataset containing a list of the models in the models data dataset;
      a model attributes dataset corresponding to each of the models, wherein each of the model attributes in the model attributes dataset is owned by one of the plurality of models and wherein each of the model attributes can only be written by the model that owns it;
      a model interfaces dataset including, a tuple corresponding to each of the models, wherein each said tuple contains a mapping operation and model attributes;
      a model attribute constraints dataset corresponding to each model attributes dataset, wherein the model attributes constraints dataset may include one or more trigger values associated with one or more of the model attributes, wherein each of the one or more trigger values are associated to one of the model attributes by one of the plurality of models that does not own the one of the model attributes;
      a model data editing tools dataset;
      a notifications dataset associated with each of the plurality of models for informing each of the plurality of models of defined events, wherein the defined event comprises a change to one of the model attributes that causes a value of one of the model attributes to violate one of the one or more trigger values;
      wherein the notifications dataset informs the one of the plurality of models associated with the violated one of the one more trigger values of a violation associated with the one of the one more trigger values; and
      a multi-model execution control dataset.

2. The multi-model database of claim 1, wherein the multi-model repository incorporates version control system operations.

3. The multi-model database of claim 1, wherein the model attributes comprise input attributes and output attributes.

4. The multi-model database of claim 3, wherein each of the one or more trigger values is associated with one of the input attributes or one of the output attributes; and
   wherein the defined event comprises a change to one of the input attributes or one of the output attributes that causes a value of one of the input attributes or one of the output attributes to violate one of the one or more trigger values.

5. The multi-model database of claim 1, wherein the defined event comprises a change to one of the model attributes that causes a value of one of the model attributes to violate one of the one or more trigger values.

6. The multi-model database of claim 5, wherein the notifications dataset informs the one of the plurality of models associated with the one of the one or more trigger values that was violated of a violation.

7. A computer database system comprising:
   a processing unit;
   a data storage for storing a multi-model database of a product system and accessible by the processing unit, said multi-model database comprising:
      a plurality of artifacts that define the multi-model database;
      a multi-model repository that holds said artifacts under version control, wherein said artifacts comprise:
         a models data dataset including a plurality of models, wherein each model is associated with a discrete aspect of the product system;
         a model registry dataset containing a list of the models in the models data dataset;
         a model attributes dataset corresponding to each of the models, wherein each of the model attributes in the model attributes dataset is owned by one of the plurality of models and wherein each of the model attributes can only be written by the model that owns it;
         a model interfaces dataset including, a tuple corresponding to each of the models, wherein each said tuple contains a mapping operation and said model attributes;
         a model attribute constraints dataset corresponding to each model attributes dataset, wherein the model attributes constraints dataset may include one or more trigger values associated with one or more of the model attributes, wherein each of the one or more trigger values are associated to one of the model attributes by one of the plurality of models that does not own the one of the model attributes;
         a model data editing tools dataset;
      a notifications dataset associated with each of the plurality of models for informing each of the plurality of models of defined events, wherein the defined event comprises a change to one of the model attributes that causes a value of one of the model attributes to violate one of the one or more trigger values;
         wherein the notifications dataset informs the one of the plurality of models associated with the violated one of the one more trigger values of a violation associated with the one of the one more trigger values; and
         a multi-model execution control dataset.

8. The database system of claim 7, wherein the multi-model repository incorporates capabilities of a version control system.

9. The database system of claim 7, wherein the model attributes comprise input attributes and output attributes.

10. The database system of claim 9, wherein each of the one or more trigger values is associated with one of the input attributes or one of the output attributes; and
    wherein the defined event comprises a change to one of the input attributes or one of the output attributes that causes a value of one of the input attributes or one of the output attributes to violate one of the one or more trigger values.

11. The database system of claim 7, wherein the defined event comprises a change to one of the model attributes that causes a value of one of the model attributes to violate one of the one or more trigger values associated with the one of the model attributes.

12. The database system of claim 11, wherein the notifications dataset informs the one of the plurality of models associated with the one of the one or more trigger values that was violated of a violation.

* * * * *